(12) United States Patent
Song et al.

(10) Patent No.: US 7,187,725 B2
(45) Date of Patent: Mar. 6, 2007

(54) METHOD AND APPARATUS FOR COMPENSATING I/Q IMBALANCE BY USING VARIABLE LOOP GAIN IN QUADRATURE DEMODULATOR

(75) Inventors: Yun-Jeong Song, Daejon (KR); PanSoo Kim, Busan (KR); Ho-Jin Lee, Daejon (KR)

(73) Assignee: Electronics and Telecommunications Research Institute (KR)

( * ) Notice: Subject to any disclaimer, the term of this patent is extended or adjusted under 35 U.S.C. 154(b) by 514 days.

(21) Appl. No.: 10/839,383

(22) Filed: May 4, 2004

(65) Prior Publication Data

US 2005/0069055 A1    Mar. 31, 2005

(30) Foreign Application Priority Data

Sep. 26, 2003    (KR) ............... 10-2003-0066845

(51) Int. Cl.
*H04L 27/00* (2006.01)
*H04L 27/08* (2006.01)
(52) U.S. Cl. .................................. 375/316; 375/345
(58) Field of Classification Search ............... 375/316, 375/345, 329, 340, 261, 279, 280; 455/232.1–235
See application file for complete search history.

(56) References Cited

U.S. PATENT DOCUMENTS

| | | | |
|---|---|---|---|
| 5,949,821 A | 9/1999 | Emami et al. | |
| 6,044,112 A | 3/2000 | Koslov | |
| 6,122,325 A | 9/2000 | Mogre et al. | |
| 6,925,132 B2* | 8/2005 | Song et al. | 375/316 |
| 7,010,059 B2* | 3/2006 | Song et al. | 375/316 |
| 7,130,359 B2* | 10/2006 | Rahman | 375/316 |

OTHER PUBLICATIONS

"Design and Analysis of an Automatic Gain Control Scheme for High-Speed Satellite Communications", M. Kim. et al., IEICE Trans. Commun., vol. E83-B, No. 1, Jan. 2000.
"Digital Filter Equalization of Analog Gain and Phase Mismatch in I-Q Receivers", F. Harris, 0-7803-3300-4, 1996, pp. 793-796.
"I/Q Imbalances Compensation by Using Variable Step-Size Adaptive Loops at Direct Conversion REceiver for SDR H/W Platform", published by Yun-Jeong Song and Sung-Woong Rha.

* cited by examiner

*Primary Examiner*—Tesfaldet Bocure
(74) *Attorney, Agent, or Firm*—Blakely Sokoloff Taylor & Zafman (57) ABSTRACT

An apparatus and method for compensating an imbalance of phase and gain between I-channel and Q-channel by using variable loop gains is disclosed. The apparatus includes: a phase error generator for generating a phase error signal by using the I-channel signal and the Q-channel signal; an average value calculator for calculating an average value of the phase error signal; a comparator for comparing the average value with a predetermined threshold; a selector for selecting a loop gain value among a set of loop gains based on the comparison result; a phase imbalance generator for generating a phase imbalance by using the selected loop gain value; and a compensator for compensating the Q-channel signal based on the phase imbalance.

20 Claims, 6 Drawing Sheets

METHOD AND APPARATUS FOR COMPENSATING I/Q IMBALANCE BY USING VARIABLE LOOP GAIN IN QUADRATURE DEMODULATOR

FIELD OF THE INVENTION

The present invention relates to a demodulator apparatus and method; and, more particularly, to an apparatus and a method for compensating a phase and a gin imbalances between an I-channel signal and a Q-channel signal by using a variable loop gain in a quadrature demodulator.

DESCRIPTION OF RELATED ARTS

In a high speed wireless communication system, a receiver receives a signal modulated based on a modulation method such as Quadrature phase shift keying (QPSK) or Quadrature Amplitude Modulation (QAM) from a transmitter and demodulates the modulated signal for restoring an original signal by using a number of analog radio frequency (RF) and intermediate frequency (IF) components such as a multiplier, an amplifier or the like. However, the analog components in analog circuitry may cause signal distortion from an imperfections, isolation therebetween, stray capacitances and signal routings.

One of factors to cause signal distortion is a gain and a phase imbalances between an I-channel signal and a Q-channel signal. The gain and the phase imbalances are generated since phases of the I-channel signal and the Q-channel signal are not perfectly orthogonal at the analog components. The gain and the phase imbalances are one of factors to degrade a performance of the quadrature demodulator in a MODEM for restoration of signal. Accordingly, various methods for compensating the phase and the gain imbalances of I/Q channels have been developed.

A method for compensating a gain and a phase imbalances is introduced by an article by Fred Harris, entitled "Digital Filter Equalization of Analog Gain and Phase Mismatch in I-Q Receivers".

In Fred's method, the phase and the gain imbalances are balanced based on balancing loops.

Figure 1:
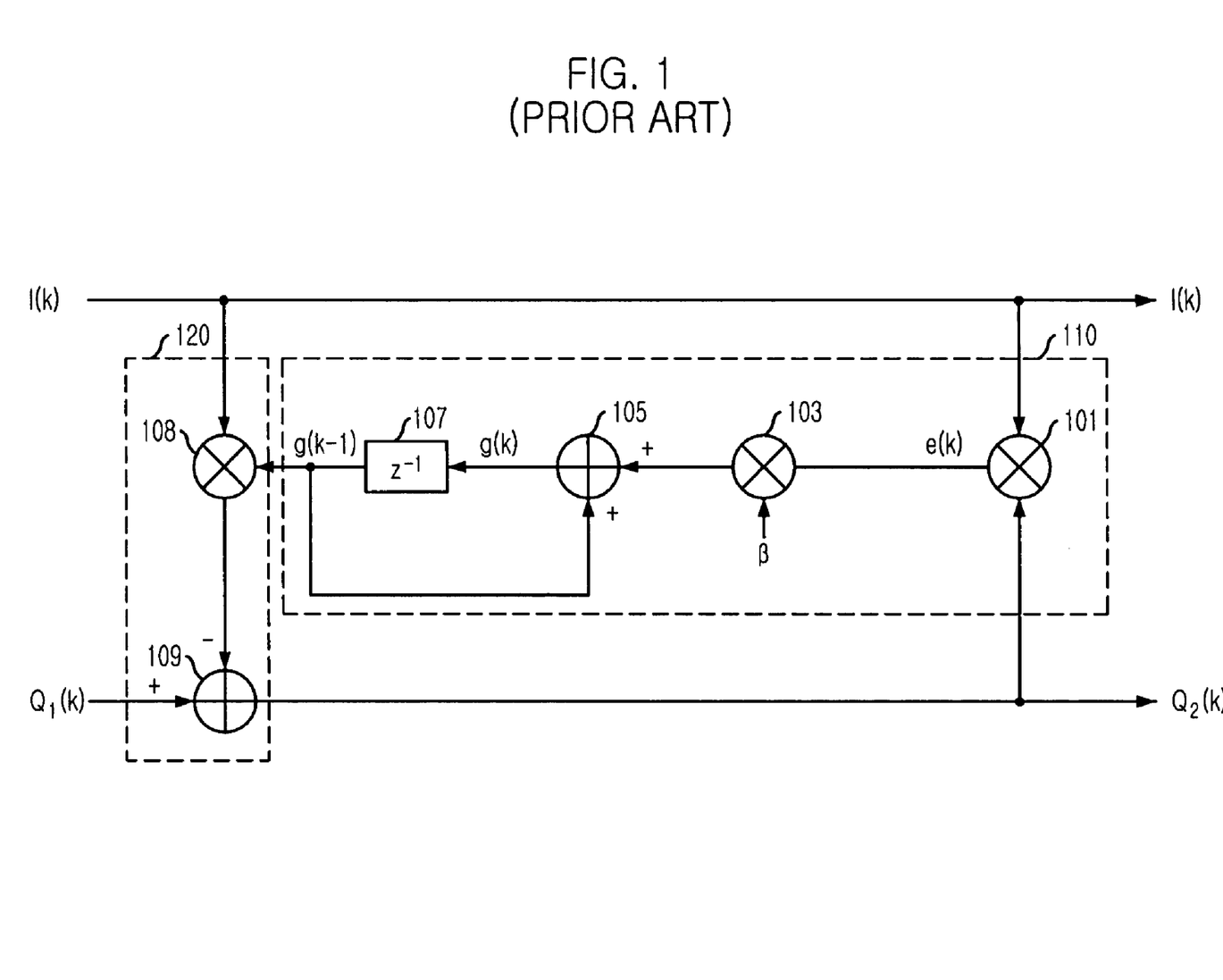
FIG. 1 is a diagram illustrating a phase imbalance compensator in accordance with a prior art.

FIG. 1 is a diagram illustrating a phase imbalance compensator for explaining balancing a phase imbalance in accordance with Fred's method.

The phase imbalance compensator includes a phase detector 110 and a phase compensator 120.

The phase detector 110 includes a first multiplier 101, a second multiplier 103, an adder 105 and a delay 107. In FIG. 1, e(k) is an error signal representing difference between the I-channel signal and the Q-channel signal, and β is a loop gain of the balancing loop. The adder 105 and the delay 107 are formed as the balancing loop and co-operated as an integrator. In the phase detector 110, the value of loop gain is not changed according to the error signal e(k).

The first multiplier 101 multiplies an I-channel signal I(k) by a Q-channel signal $Q_1(k)$ to thereby generate the error signal e(k) by.

The second multiplier 103 multiplies the error signal e(k) by the loop gain β.

The adder 105 and the delay 107, which are operated as an integrator, detect the phase imbalance g(k) between the I-channel signal I(k) and a Q-channel $Q_2(k)$.

The phase compensator 120 includes a third multiplier 108 and a second adder 109.

The third multiplier 108 multiplies the phase imbalance g(k−1), which is a phase imbalance of a previous signal sequence k−1 and delayed at the delay 107, by the I-channel signal I(k). The adder 109 eliminates the phase imbalance by subtracting the phase imbalance from the Q-channel signal $Q_1(k)$.

Figure 2:
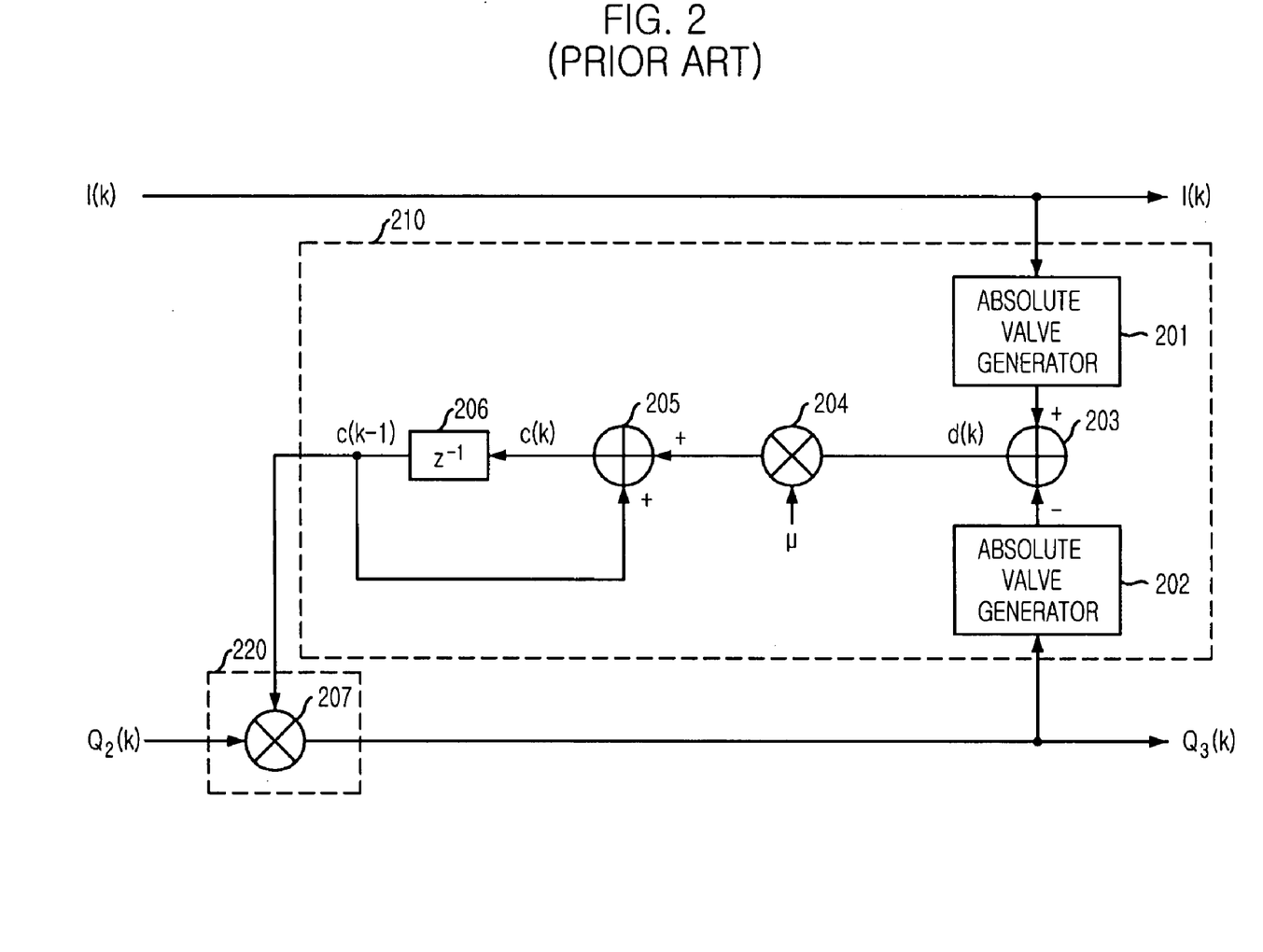
FIG. 2 is a diagram showing a gain imbalance compensator in accordance with the prior art.

FIG. 2 is a diagram showing a gain imbalance compensator for explaining balancing a gain imbalance in accordance with Fred's method.

The gain imbalance compensator includes a gain detector 210 and a gain compensator 220.

Referring to FIG. 2, the gain detector 210 includes a plurality of absolute value generators 201 and 202, a third adder 203, a fourth multiplier 204, a fourth adder 205 and a second delay 206. The gain compensator 220 includes a fifth multiplier 207.

A difference between an absolute value of I-channel I(k) and an absolute value of phase-compensated Q-channel signal $Q_2(k)$ is represented by d(k) as an error signal and a loop gain is represented by μ. The fourth adder 205 and the delay 206 are formed the balancing loop and co-operated as an integrator. The loop gain μ is not changed according to the error signal e(k).

The absolute value generators 201 and 202 computes absolute values of the I-channel signal I(k) and the phase-compensated Q-channel signal $Q_3(k)$.

The third adder 203 subtracts the absolute value of the phase-compensated Q-channel signal $Q_3(k)$ from the absolute values of the I-channel signal I(k), thereby obtaining an error signal d(k).

The fourth multiplier 204 multiplies the loop gain μ by the error signal d(k).

The fourth adder 205 and the second delay 206, which are operated as an integrator, detect a gain imbalance c(k) between the I-channel signal I(k) and the phase-compensated Q-channel signal $Q_2(k)$ based on an output of the fourth multiplier 204.

The fifth multiplier 207 compensates the gain imbalance of phase-compensated Q-channel signal $Q_2(k)$ by multiplying a gain imbalance c(k−1) of a previous signal sequence k−1, which is delayed at the second delay 206, with phase-compensated Q-channel signal $Q_2(k)$.

As mentioned above, the conventional phase and gain imbalance compensator detects the phase and the gain imbalances by applying a fixed value of loop gain without considering the error signal of the I-channel signal and the Q-channel signal for compensating the phase and the gain imbalances. In the conventional phase and gain imbalance compensator, it takes such a long time for loop convergence and it slow down to compensate the phase and the gain imbalances in the quadrature demodulator.

SUMMARY OF THE INVENTION

It is, therefore, an object of the present invention to provide an apparatus and a method for compensating a phase and a gain imbalances between an I-channel signal and a Q-channel signal by using a variable loop gain which is varied according to an average value of error signals between an I-channel signal and a Q-channel signal in a quadrature demodulator.

In accordance with an aspect of the present invention, there is provided an apparatus for compensating a phase imbalance between an I-channel signal and a Q-channel signal, the apparatus including: a phase error generator for generating a phase error signal by using the I-channel signal and the Q-channel signal; an average value calculator for calculating an average value of the phase error signal; a comparator for comparing the average value with a predetermined threshold; a selector for selecting a loop gain value among a set of loop gains based on the comparison result; a phase imbalance generator for generating a phase imbalance by using the selected loop gain value; and a compensator for compensating the Q-channel signal based on the phase imbalance.

In accordance with another aspect of the present invention, there is also provided an apparatus for compensating a gain imbalance between an I-channel signal and a Q-channel signal, the apparatus including: an absolute value generator for calculating an absolute value of the I-channel signal and an absolute value of the Q-channel signal; a gain error signal generator for generating a gain error signal by adding the absolute values of the I-channel signal and the Q-channel signal; an average value generator for calculating an average value of the gain error signal; a comparator for comparing the average value with a predetermined threshold; a selector for selecting a loop gain value among a set of loop gains based on the comparison result; a gain imbalance generator for generating a gain imbalance by using the selected loop gain value; and a compensator for compensating the Q-channel signal based on the gain imbalance.

In accordance with another aspect of the present invention, there is also provided an apparatus for compensating a phase and a gain imbalances between an I-channel signal and a Q-channel signal, the apparatus including: a phase imbalance detector for detecting a phase imbalance between the I-channel signal and the Q-channel signal by using a first variable step adaptive filter; a compensator for compensating the Q-channel signal based on the phase imbalance to thereby generate a phase-compensated Q-channel signal; a gain imbalance detector for detecting a gain imbalance between the I-channel signal and the phase-compensated Q-channel signal by using a second variable step adaptive filter; and a compensator for compensating the Q-channel signal based on the gain imbalance.

In accordance with another aspect of the present invention, there is also provided a method for compensating a phase imbalance between an I-channel signal and a Q-channel signal, the method including the steps of: a) generating a phase error signal by using the I-channel signal and the Q-channel signal; b) calculating an average value of the phase error signal; c) comparing the average value with a predetermined threshold; d) selecting a loop gain value among a set of loop gains based on the comparison result; e) generating a phase imbalance by using the selected loop gain value; and f) compensating the Q-channel signal based on the phase imbalance.

In accordance with another aspect of the present invention, there is also provided a method for compensating a phase imbalance between an I-channel signal and a Q-channel signal, the method including the steps of: a) generating a phase error signal by using the I-channel signal and the Q-channel signal; b) calculating an average value of the phase error signal; c) comparing the average value with a predetermined threshold; d) selecting a loop gain value among a set of loop gains based on the comparison result; e) generating a phase imbalance by using the selected loop gain value; and f) compensating the Q-channel signal based on the phase imbalance.

In accordance with another aspect of the present invention, there is also a method for compensating a gain imbalance between an I-channel signal and a Q-channel signal, the method including the steps of: a) calculating an absolute value of the I-channel signal and an absolute value of the Q-channel signal; b) generating a gain error signal by adding the absolute values of the I-channel signal and the Q-channel signal; c) calculating an average value of the gain error signal; d) comparing the average value with a predetermined threshold; e) selecting a loop gain value among a set of loop gains based on the comparison result; f) generating a gain imbalance by using the selected loop gain value; and g) compensating the Q-channel signal based on the phase imbalance.

In accordance with another aspect of the present invention, there is also a method for compensating a phase and a gain imbalances between an I-channel signal and a Q-channel signal, the method including the steps of: a) generating a phase error signal by using the I-channel signal and the Q-channel signal; b) calculating an average value of the phase error signal; d) comparing the average value with a predetermined threshold; e) selecting a loop gain value among a set of loop gains based on the comparison result; f) generating a phase imbalance by using the selected loop gain value; g) compensating the Q-channel signal based on the phase imbalance to generate a phase-compensated Q-channel signal; h) calculating an absolute value of the I-channel signal and an absolute value of the phase-compensated Q-channel signal; i) generating a gain error signal by adding the absolute values of the I-channel signal and the phase-compensated Q-channel signal; j) calculating an average value of the gain error signal; k) comparing the average value with a predetermined threshold; l) selecting a loop gain value among a set of loop gains based on the comparison result; m) generating a gain imbalance by using the selected loop gain value; and n) compensating the Q-channel signal based on the gain imbalance.

BRIEF DESCRIPTION OF THE DRAWINGS

The above and other objects and features of the present invention will become better understood with regard to the following description of the preferred embodiments given in conjunction with the accompanying drawings, in which.

DETAILED DESCRIPTION OF THE INVENTION

Hereinafter, preferred embodiments of the present invention will be described in detail with reference to the accompanying drawings.

Figure 3:
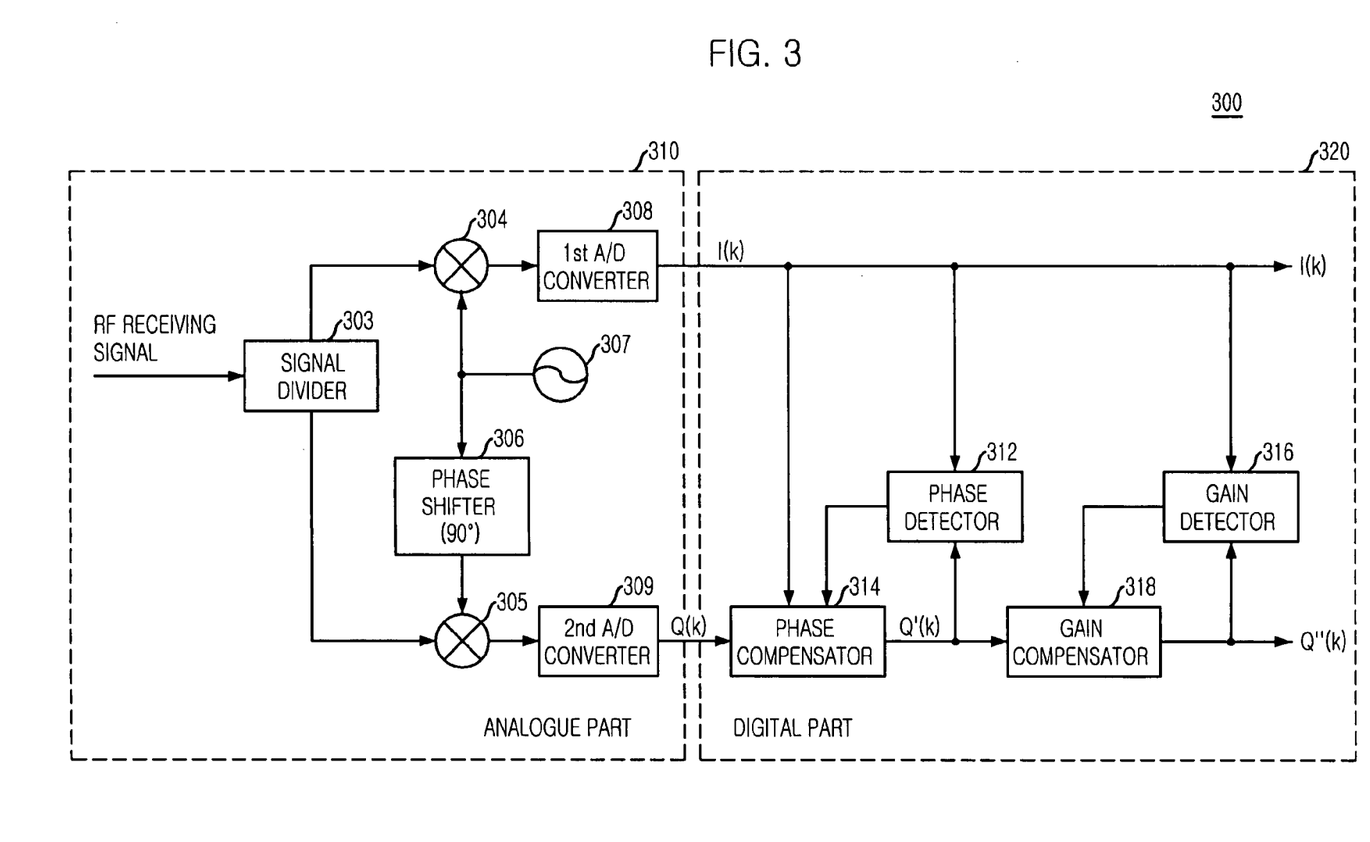
FIG. 3 is a diagram showing a quadrature demodulator for compensating a phase and a gain imbalances between I-channel and Q-channel in accordance with a preferred embodiment of the present invention.

FIG. 3 is a diagram showing a quadrature demodulator for compensating a phase and a gain imbalances between an I-channel signal and a Q-channel signal in accordance with a preferred embodiment of the present invention.

As shown in FIG. 3, the quadrature demodulator 300 includes an analog part 310 provided with a signal divider 303, a first multiplier 304, a second multiplier 305, a phase shifter 306, a carrier signal generator 307, a first A/D converter 308 and a second A/D converter 309, and a digital part 320 for compensating a phase and a gain imbalances between an I-channel signal and a Q-channel signal.

The signal divider 303 receives a radio frequency (RF) signal and divides the RF signal into a first and a second portions. The first portion of the RF signal is transmitted to the first multiplier 304, whereas the second portion of the RF signal is transmitted to the second multiplier 305.

The first multiplier 304 generates an analog I-channel signal by mixing the first portion of the RF signal with a carrier signal outputted from the carrier signal generator 307. The second multiplier 305 generates an analog Q-channel signal by mixing the second portion of the RF signal with a 90 degree phase shifted carrier signal phase-shifted by the phase shifter 306.

The first and the second A/D converters 308, 309 convert the analog I-channel and the analog Q-channel signals to a digital I-channel signal I(k) and a digital Q-channel signal Q(k), respectively, wherein k is a positive integer representing the sequence of the signals.

The digital part 320 is provided with a phase detector 312, a phase compensator 314, a gain detector 316 and a gain compensator 318 for compensating a phase and a gain imbalances between the digital I-channel I(k) and the digital Q-channel Q(k).

The phase detector 312 receives the digital I-channel signal I(k) and the digital Q-channel signal Q(k), and detects a phase imbalance between the digital I-channel signal I(k) and the digital Q-channel signal Q(k) by using a variable loop gain. The phase compensator 314 compensates a phase of Q-channel signal Q(k) in response to the detected imbalance amount of phase, thereby generating a phase-compensated Q-channel signal Q'(k).

The gain detector 316 receives the digital I-channel signal I(k) and the phase-compensated Q-channel signal Q'(k), and detects a gain imbalance between the I-channel signal I(k) and the phase-compensated Q-channel signal Q'(k) by using a variable loop gain. The gain compensator 318 compensates a gain of the phase-compensated Q-channel signal Q'(k) in response to the detected amount of the gain imbalance in the gain detector 316.

Although the preferred embodiment of the present invention is described with no low pass filter included, it is possible that a plurality of filters such as low pass filters be included in front of the first and the second A/D converters 308 and 309 or in front of the first and the second multipliers 304 and 305.

As mentioned above, the analog part 310 generates the gain and the phase imbalances between the first and the second portions of the RF receiving signal after the RF receiving signal passes through the analog part 310 since the first and the second multipliers 304, 305 and the first and the second A/D converters 308, 309 are never perfectly balanced. The gain and the phase imbalances generated by the analog part 310 is detected by the phase detector 312 and the gain detector 316, respectively.

Figure 4A:
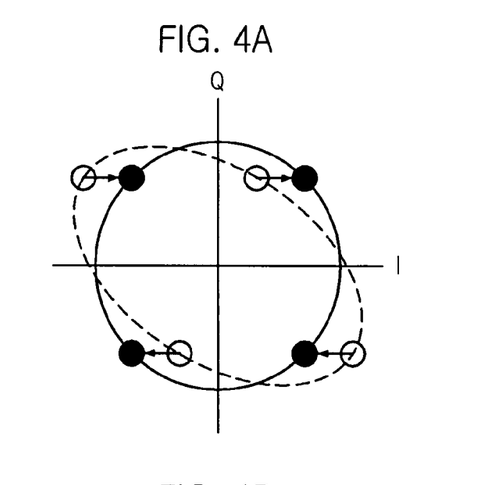
FIGS. 4A and 4D are constellations of I-channel and Q-channel showing a phase imbalance between I-channel and Q-channel.
Figure 4B:
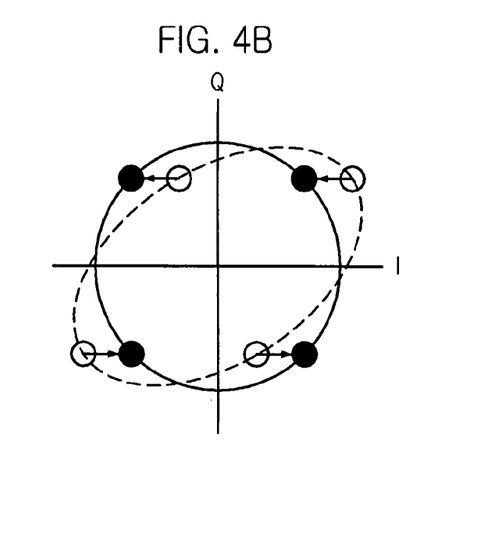
Figure 4C:
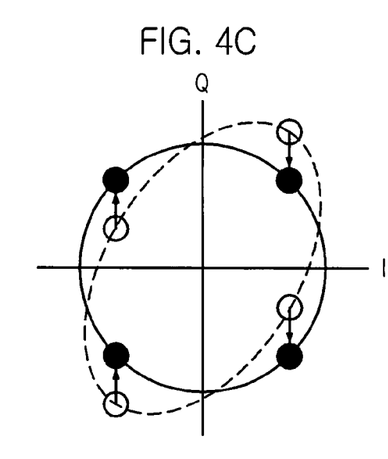
Figure 4D:
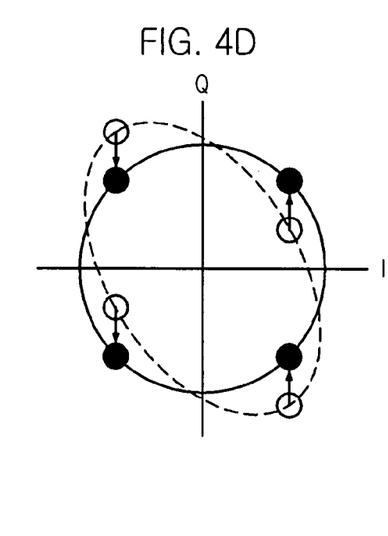

FIGS. 4A and 4D are the constellations of an I-channel signal and a Q-channel signal showing a phase imbalance there between.

FIGS. 4A and 4B show diagrams illustrating that the phase imbalance of a Q-channel signal Q(k) is compensated based on the I-channel signal I(k) as a reference channel and FIGS. 4C and 4D show diagrams representing that the phase imbalance of an I-channel signal I(k) is compensated based on the Q-channel signal Q(k) as a reference channel. A solid line and four block dots ● represent a desired position of restored signal and a dotted line and four white dots ○ represent positions of restored signal caused by the phase imbalance between the I-channel signal I(k) and the Q-channel signal Q(k).

Referring to FIGS. 4A to 4D, there are a certain type of distortion in constellations which is caused by the phase imbalance.

Since an orthogonality between the I-channel signal and the Q-channel signal is not guaranteed by the phase imbalance, there shows a correlation between the I-channel signal and the Q-channel signal. The correlation of the I-channel signal and the Q-channel signal after passing through the analog part 310 is expressed as following equation Eq. 1.

$$r(k)=I(k)+j(\gamma I(k) \sin \Phi+\gamma Q(k)\cos \Phi)+w_I(k)+w_Q(k) \qquad \text{Eq. 1}$$

Wherein, r(k) represent a signal including the I-channel signal I(k) and the Q-channel signal Q(k) generated after passing through the analog part 310, $w_I(k)$ is a noise of I-channel signal, $w_Q(k)$ is a noise of Q-channel signal, γ is a gain imbalance factor, and Φ is a phase imbalance factor.

As shown in Eq. 1, the gain imbalance γ of the Q-channel signal is a relative value of the I-channel signal and the phase imbalance Φ is a cosine or a sine value which represents a phase difference between the Q-channel signal Q(k) and the I-channel signal I(k).

Figure 5:
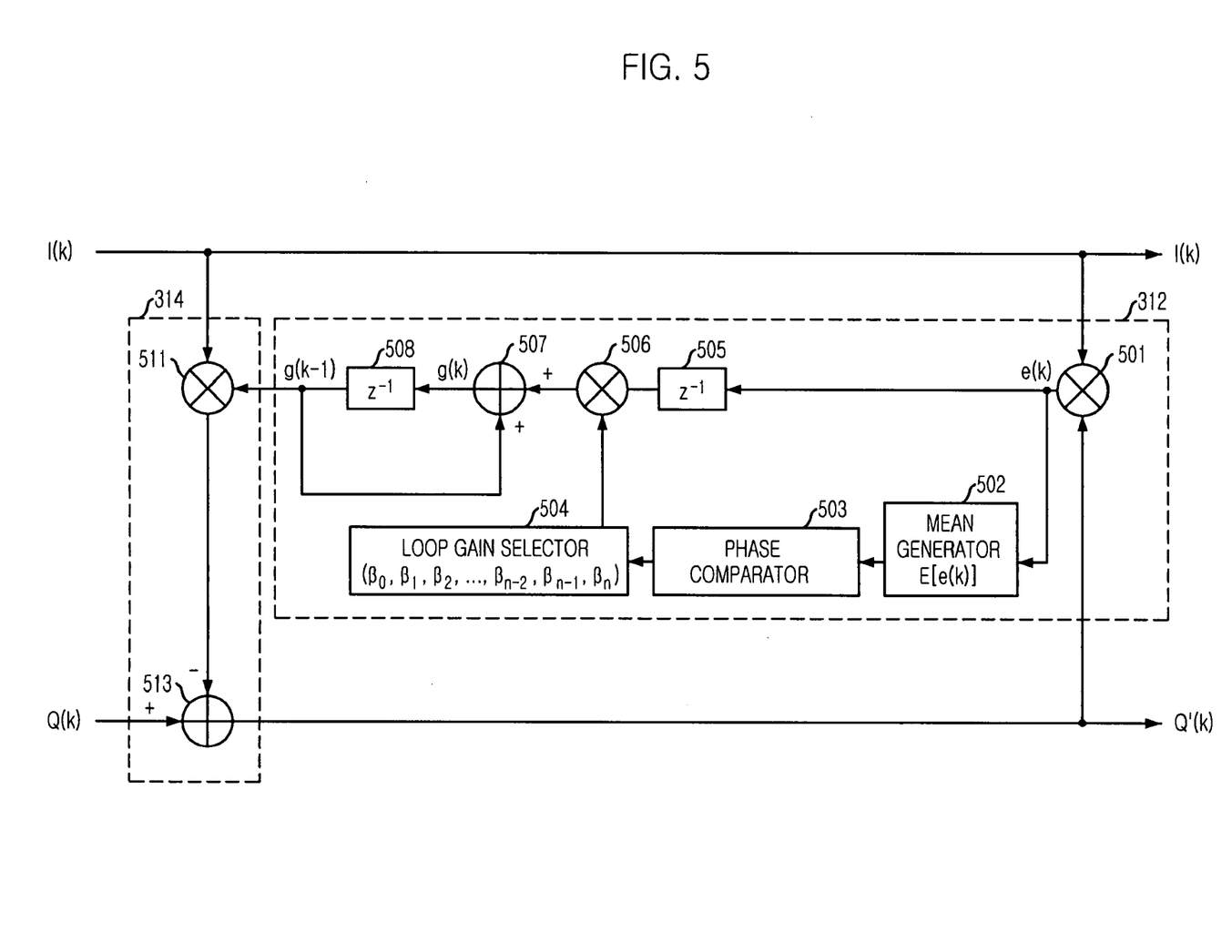
FIG. 5 is a diagram illustrating a phase imbalance compensator in accordance with a preferred embodiment of the present invention.

FIG. 5 is a detailed diagram illustrating a compensation structure provided with the phase detector 312 and the phase compensator 314 in FIG. 3 for compensating the phase imbalance between the I-channel signal and the Q-channel signal.

In FIG. 5, e(k) is an error signal of k signal sequence representing a phase imbalance between the I-channel signal I(k) and the Q-channel signal Q(k), and obtained by multiplying the I-channel signal I(k) and the Q-channel signal Q(k). β(k) is a set of loop gains having n number of loop gains $\{\beta_0, \beta_1, \ldots, \beta_{n-1}, \beta_n\}$ each of which has a predetermined step-size difference. The first adder 507 and the second delayer 508 are formed an adaptive loop. By adaptively applying the loop gain β(k), an acquisition speed of the adaptive loop can be controlled. The phase imbalance g(k) of signal sequence k is obtained based on a phase imbalance g(k−1) of previous signal sequence k−1 and it can be expressed as:

$$g(k)=g(k-1)+\beta(k)e(k) \qquad \text{Eq. 2}$$

Conventionally, a loop gain value is fixed and it is predetermined as less than 0.1. If the loop gain value is set as comparative large value, the loop may be quickly stabilized but a loop noise may be increased. In contrary, if the loop gain value is set as comparative small value, the loop noise may be decreased but it takes a long time to stabilize the loop.

For overcoming the above mentioned conventional problem, a value of loop gain is adaptively determined based on the phase imbalance between the I-channel signal I(k) and the Q-channel signal Q(k) in the preferred embodiment of the present invention. That is, if the phase imbalance is comparatively large, the loop gain is set as a comparative large value, and if the phase imbalance is comparatively small, the loop gain is set as a comparative small value. By adaptively applying the variable loop gain in response to the phase imbalance, the loop is quickly stabilized and, the loop noise can be decreased.

Therefore, in the present invention, an average value of phase imbalances is obtained and the average value and a predetermined threshold value are compared. The variable loop gain value is selected based on the comparison results. The selection of loop gain value can expressed as:

$$\beta(k)=\beta_0 E[e(k)] \in D_e$$

$$\beta(k)=\beta_i E[e(k)] \in D_i \text{ and } E[e(k)] \in D_{i+1} \qquad \text{Eq. 3}$$

The loop gain value is determined according to an average value of error signals e(k) generated by the mean generator 502. Detailed explanation of the setting the variable loop gain is described hereinafter.

If the average of error signals e(k) is larger than a predetermined threshold value then a loop gain value corresponding to the predetermined threshold value is selected. The threshold value is predetermined value based on simulation data.

As shown in FIG. 5, the phase detector 312 includes a third multiplier 501, a mean generator 502, a phase comparator 503, a loop gain selector 504, a first delay 505, a fourth multiplier 506, a first adder 507 and a second delay 508. The phase compensator 314 includes a fifth multiplier 511 and a second adder 513.

The third multiplier 501 multiplies the I-channel signal I(k) by the Q-channel signal Q(k) to thereby generate an error signal e(k).

The first delay 505 delays the error signal e(k) and outputs the delayed error signal to the fourth multiplier 506 for generating a variable loop gain according to the error signal e(k) at the mean generator 502, the phase comparator 503 and the loop gain selector 504.

The mean generator 502 calculates an average value of error signals e(k) and transmits the calculated average value to the phase comparator 503.

The phase comparator 503 compares the average value E[e(k)] of error signals with a predetermined threshold value previously stored therein. The loop gain selector 504 adaptively selects a loop gain based on the comparison result of the phase comparator 503. The loop gain selector 504 selects one of $\{\beta_0, \beta_1, \ldots, \beta_{n-1}, \beta_n\}$ based on the comparison result of the phase comparator 503. By selecting the loop gain value according to the average value of the error signal e(k), the loop is quickly stabilized and the loop noise is decreased.

The fourth multiplier 506 multiplies the error signal e(k) delayed by the first delay 505 by the selected loop gain value to generate a loop gained error signal.

The first adder 507 generates a phase imbalance g(k) by adding a phase imbalance g(k−1) of a previous signal sequence k−1 and the loop gained error signal.

The second delay 508 stores the detected phase imbalance g(k) and delays the detected phase imbalance g(k) for next signal sequence k+1.

As mentioned above, the first adder 507 and the second delay 508 forms a loop for delaying the currently detected phase imbalance g(k) in order to compensate the Q-channel signal Q(k+1) of next signal sequence K+1.

The detected phase imbalance is inputted to the second delay 508 and delays the phase imbalance g(k) of k signal sequence in order to compensate the Q-channel signal Q(k+1) of k+1 signal sequence.

The detected phase imbalance g(k−1) of previous signal sequence k−1 is multiplied with the I-channel signal I(k) at the fifth multiplier 511 and the phase imbalance of Q-channel signal Q(k) based on the I-channel signal I(k) is eliminated by the second adder 513 to generates a phase compensated Q-channel signal Q'(k), which is expressed as:

$$\gamma Q(k)\cos \Phi \qquad \text{Eq. 4}$$

For restoring a transmitted Q-channel signal, a value of $1/(\gamma \cos \Phi)$ must be multiplied to Eq. 4. Therefore, a gain imbalance needs to be detected and compensated.

Figure 6:
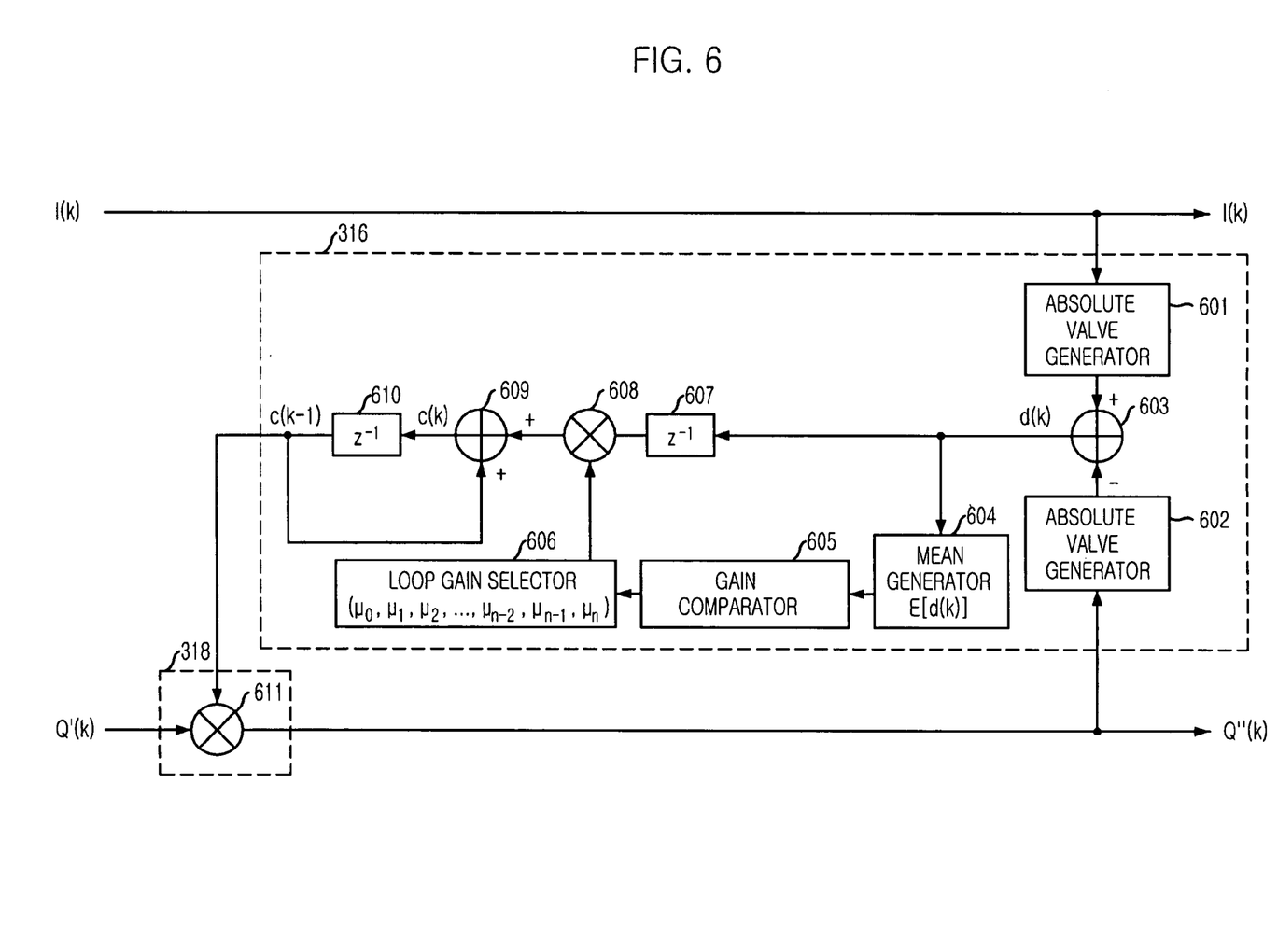
FIG. 6 is a diagram showing a gain imbalance compensator in accordance with a preferred embodiment of the present invention.

FIG. 6 is a detailed diagram showing a compensating structure provided with the gain detector 316 and the gain compensator 318 for compensating the gain imbalance between the I-channel signal and the phase compensated Q-channel signal Q'(k).

Referring to FIG. 6, the gain detector 312 includes a plurality of absolute value generators 601 and 602, a third adder 603, a mean generator 604, a gain comparator 605, a loop gain selector 606, a third delay 607, a sixth multiplier 608, a fourth adder 609 and a fourth delay 610, and the gain compensator 318 includes a seventh multiplier 611.

In FIG. 6, d(k) is a error signal of k signal sequence representing a gain difference between the I-channel signal I(k) and the phase-compensated Q-channel signal Q'(k). μ(k) is a set of n number of loop gains $\{\mu_0, \mu_1, \mu_2, \ldots, \mu_{n-1}, \mu_n\}$ each of which has a predetermined step-size difference. The third adder 609 and the fourth delay 610 are formed an adaptive loop. By the adaptive loop and selected loop gain, the gain imbalance c(k) of the current signal sequence k is obtained based on a gain imbalance c(k−1) of previous signal sequence k−1 and it can be expressed as:

$$c(k)=c(k-1)+\mu(k)d(k-1) \qquad \text{Eq. 5}$$

An average value of gain difference d[k] is obtained and if the average value is in a predetermined range of thresholds, corresponding loop gain value is selected. Selection of loop gain value is expressed as:

$$\mu(k)=\mu_0 E[d(k)] \in T_d$$

$$\mu(k)=\mu_i E[d(k)] \in T_i \text{ and } E[D(k)] \in T_{i+1} \qquad \text{Eq. 6}$$

The loop gain value is selected based on the average value of error signals representing gain differences, E[D(k)] inputted to the adaptive loop.

The mean generator 604 obtains an average value of error signals E[d(k)]. If the average value is larger than a threshold value, corresponding loop gain value $\mu_i$ is selected. The threshold value $T_i$ is predetermined based on data including average values of gain difference obtained form simulation studies.

The absolute value generators 601 and 602 calculate absolute values of the I-channel signal I(k) and the phase-compensated Q-channel signal Q'(k).

The third adder 603 generates the error signal d(k) by subtracting the absolute value of the phase-compensated Q-channel signal Q'(k) from the absolute value of the I-channel signal I(k).

The mean generator 604 calculates an average value E[d(k)] of the error signals d(k).

The gain comparator 605 compares the average value E[d(k)] with a predetermined threshold values previously stored therein.

The loop gain selector 606 selects one of loop gain based on a comparison result of the gain comparator 605. That is, the loop gain selector 606 selects one of loop gains $\{\mu_0, \mu_1, \mu_2, \ldots, \mu_{n-1}, \mu_n\}$ corresponding to the average value, if the average value E[d(k)] of the error signal d(k) in a predetermined range. By selecting and applying the loop gain according to the average value of error signal d(k), a time for acquisition would be fast and durability of loop noise is increased.

The third delay 607 delays the error signal d(k) and outputs the delayed error signal to the sixth multiplier 608.

The sixth multiplier 608 multiplies the delayed error signal d(k) by the loop gain selected by the loop gain selector 606 and outputs a loop gained error signal to the fourth adder 609.

The fourth adder 609 generates a gain imbalance c(k) by adding a gain imbalance c(k−1) of previous signal sequence k−1 and the loop gained error signal from the sixth multiplier 608.

The fourth delay 610 stores the detected gain imbalance c(k) and delays the detected gain imbalance c(k) for next signal sequence k+1.

As mentioned above, the fourth adder 609 and the fourth delay 610 are formed an adaptive loop for delaying the currently detected gain imbalance c(k) in order to compensate the phase-compensated Q-channel signal Q'(k+1) of next signal sequence K+1.

The detected gain imbalance is inputted to the fourth delay 610 and delays the gain imbalance g(k) of k signal sequence in order to compensate the phase-compensated Q-channel signal Q'(k+1) of k+1 signal sequence.

The seventh multiplier 611 compensates the phase-compensated Q-channel signal by multiplying the detected gain imbalance c(k−1) with the phase-compensated Q-channel signal Q'(k) to generate a phase/gain-compensated Q-channel signal Q'(k).

As mentioned above, the method of compensating the Q-channel signal Q(k) based on the detected phase and the gain imbalances is explained based on the I-channel signal I(k) as a reference channel by referring to the preferred embodiment of FIGS. 5 and 6. However, a method of compensating the I-channel signal based on a phase and a gain imbalances would be identical, if the Q-channel signal Q(k) is set as a reference channel and the I-channel signal I(k) is set as an object signal. In case of setting the Q-channel signal Q(k) as the reference channel, the I-channel signal I(k) is compensated based on the phase and the gain imbalances by using the variable loop gain which is obtained by identical method used for detecting the phase and the gain imbalances of the preferred embodiment of FIGS. 5 and 6.

In the preferred embodiment shown in FIGS. 5 and 6, the phase imbalance compensator and the gain imbalance compensator are implemented as one device. However, the phase imbalance compensator and the gain imbalance compensator can be independently implemented as separated two devices.

As mentioned above, the present invention can prevent to degrade a performance of quadrature demodulator caused by the phase and the gain imbalances between an I-channel signal and a Q-channel signal.

Furthermore, the present invention can improve the acquisition performance and the tracing performance by using the variable loop gain based on the average value of error signal between an I-channel signal and a Q-channel signal for detecting and compensating the phase and the gain imbalances.

Therefore, the present invention of quadrature demodulator can be used in high-speed communication system, which requires quick acquisition and stabilized tracing performance.

The present application contains subject matter related to Korean patent application No. KR 2003-0066845, filed in the Korean patent office on Sep. 26, 2003, the entire contents of which being incorporated herein by reference.

While the present invention has been described with respect to certain preferred embodiments, it will be apparent to those skilled in the art that various changes and modifications may be made without departing from the scope and spirit of the invention as defined in the following claims.

What is claimed is:

1. An apparatus for compensating a phase imbalance between an I-channel signal and a Q-channel signal, the apparatus comprising:
    means for generating a phase error signal by using the I-channel signal and the Q-channel signal;
    means for calculating an average value of the phase error signal;
    means for comparing the average value with a predetermined threshold;
    means for selecting a loop gain value among a set of loop gains based on the comparison result;
    means for generating a phase imbalance by using the selected loop gain value; and
    means for compensating the Q-channel signal based on the phase imbalance.

2. The apparatus as recited in claim 1, wherein the phase error signal is obtained by multiplying the I-channel signal with the Q-channel signal.

3. The apparatus as recited in claim 2, wherein the compensating means includes:
    means for multiplying the I-channel signal by the selected loop gain value; and
    means for subtracting the multiplied value from the Q-channel signal.

4. The apparatus as recited in claim 1, further comprising:
    a first delay for delaying the phase error signal;
    a multiplier for multiplying the delayed phase error signal by the selected loop gain value;
    an integrator for integrating the multiplied results, thereby generating the phase imbalance.

5. The apparatus as recited in claim 4, wherein the integrator includes:
    an adder for adding the multiplied results and a gain imbalance of previous signal sequence thereby generating the gain imbalance of current signal sequence; and
    a second delay for receiving the gain imbalance of current signal sequence and delaying the gain imbalance of current signal sequence thereby outputting the gain imbalance of current signal sequence to the adder for calculating a gain imbalance of next signal sequence.

6. An apparatus for compensating a gain imbalance between an I-channel signal and a Q-channel signal, the apparatus comprising:
    means for calculating an absolute value of the I-channel signal and an absolute value of the Q-channel signal;
    means for generating a gain error signal by adding the absolute values of the I-channel signal and the Q-channel signal;
    means for calculating an average value of the gain error signal;
    means for comparing the average value with a predetermined threshold;
    means for selecting a loop gain value among a set of loop gains based on the comparison result;
    means for generating a gain imbalance by using the selected loop gain value; and
    means for compensating the Q-channel signal based on the gain imbalance.

7. The apparatus as recited in claim 6, wherein the gain error signal is obtained by subtracting the absolute value of the Q-channel signal from the absolute value of the I-channel signal.

8. The apparatus as recited in claim 6, wherein the compensating means is a multiplier for multiplying the Q-channel signal by the selected loop gain value.

9. The apparatus as recited in claim 6, further comprising:
a first delay for delaying the gain error signal;
a multiplier for multiplying the delayed gain error signal by the selected loop gain value;
an integrator for integrating the multiplied results, thereby generating the gain imbalance.

10. The apparatus as recited in claim 9, wherein the integrator includes:
an adder for adding the multiplied results and a gain imbalance of previous signal sequence thereby generating the gain imbalance of current signal sequence; and
a second delay for receiving the gain imbalance of current signal sequence and delaying the gain imbalance of current signal sequence thereby outputting the gain imbalance of current signal sequence to the adder for calculating a gain imbalance of next signal sequence.

11. An apparatus for compensating a phase and a gain imbalances between an I-channel signal and a Q-channel signal, the apparatus comprising:
means for detecting a phase imbalance between the I-channel signal and the Q-channel signal by using a first variable step adaptive filter;
means for compensating the Q-channel signal based on the phase imbalance to thereby generate a phase-compensated Q-channel signal;
means for detecting a gain imbalance between the I-channel signal and the phase-compensated Q-channel signal by using a second variable step adaptive filter; and
means for compensating the Q-channel signal based on the gain imbalance.

12. The apparatus as recited in claim 11, wherein the phase imbalance detecting means includes:
means for calculating an average value of the phase error signal;
means for comparing the average value with a predetermined threshold;
means for selecting a loop gain value among a set of loop gains based on the comparison result; and
means for generating a phase imbalance by using the selected loop gain value.

13. The apparatus as recited in claim 11, wherein the gain imbalance detecting means includes:
means for generating a gain error signal by adding the absolute values of the I-channel signal and the phase-compensated Q-channel signal;
means for calculating an average value of the gain error signal;
means for comparing the average value with a predetermined threshold;
means for selecting a loop gain value among a set of loop gains based on the comparison result; and
means for generating a gain imbalance by using the selected loop gain value.

14. A method for compensating a phase imbalance between an I-channel signal and a Q-channel signal, the method comprising the steps of:
a) generating a phase error signal by using the I-channel signal and the Q-channel signal;
b) calculating an average value of the phase error signal;
c) comparing the average value with a predetermined threshold;
d) selecting a loop gain value among a set of loop gains based on the comparison result;
e) generating a phase imbalance by using the selected loop gain value; and
f) compensating the Q-channel signal based on the phase imbalance.

15. The method as recited in claim 14, wherein the step a) includes the steps of:
a1) obtaining the phase error signals by multiplying the reference channel and the object channel;
a2) selecting the variable loop gain based on the average value of phase error signals;
a3) delaying the phase error signal;
a4) multiplying the selected variable loop gain and the delayed phase error signal; and
a5) detecting the phase imbalance between the object channel and reference channel by integrating the multiplying results of step a4).

16. The method as recited in claim 15, wherein in the step a2), the variable loop gain is adaptively selected by obtaining the average value of the phase error signal and comparing the average value and predetermined thresholds.

17. A method for compensating a gain imbalance between an I-channel signal and a Q-channel signal, the method comprising the steps of:
a) calculating an absolute value of the I-channel signal and an absolute value of the Q-channel signal;
b) generating a gain error signal by adding the absolute values of the I-channel signal and the Q-channel signal;
c) calculating an average value of the gain error signal;
d) comparing the average value with a predetermined threshold;
e) selecting a loop gain value among a set of loop gains based on the comparison result;
f) generating a gain imbalance by using the selected loop gain value; and
g) compensating the Q-channel signal based on the phase imbalance.

18. The method as recited in claim 17, wherein the step a) includes the steps of:
a1) obtaining a first absolute value of the reference channel and a second absolute value of the object channel and obtaining the gain error signals by subtracting the second absolute value from the first absolute value;
a2) selecting the variable loop gain according to the average value of the gain error signals;
a3) delaying the gain error signals;
a4) multiplying the selected variable loop gain and the delayed gain error signal to generate a multiplied result; and
a5) detecting the gain imbalance between the object channel and the reference channel by integrating the multiplied result.

19. The method as recited in claim 18, wherein in the step a2), the variable loop gain is adaptively selected by obtaining the average value of the gain error signal and comparing the average value and predetermined thresholds.

20. A method for compensating a phase and a gain imbalances between an I-channel signal and a Q-channel signal, the method comprising the steps of:
a) generating a phase error signal by using the I-channel signal and the Q-channel signal;
b) calculating an average value of the phase error signal;
d) comparing the average value with a predetermined threshold;
e) selecting a loop gain value among a set of loop gains based on the comparison result;

f) generating a phase imbalance by using the selected loop gain value; and
g) compensating the Q-channel signal based on the phase imbalance to generate a phase-compensated Q-channel signal;
h) calculating an absolute value of the I-channel signal and an absolute value of the phase-compensated Q-channel signal;
i) generating a gain error signal by adding the absolute values of the I-channel signal and the phase-compensated Q-channel signal;
j) calculating an average value of the gain error signal;
k) comparing the average value with a predetermined threshold;
l) selecting a loop gain value among a set of loop gains based on the comparison result;
m) generating a gain imbalance by using the selected loop gain value; and
n) compensating the Q-channel signal based on the gain imbalance.

* * * * *